United States Patent
Pan et al.

(10) Patent No.: US 9,332,559 B2
(45) Date of Patent: May 3, 2016

(54) METHOD AND CHANNEL SELECTOR FOR SELECTING AN OPERATION CHANNEL, AND WIRELESS NETWORK CONNECTING APPARATUS INCLUDING THE CHANNEL SELECTOR

(71) Applicants: LITE-ON ELECTRONICS (GUANGZHOU) LIMITED, Guangzhou (CN); LITE-ON TECHNOLOGY CORP., Taipei (TW)

(72) Inventors: Chih-Li Pan, Taipei (TW); Shiou-Yu Lee, Taipei (TW); Chih-Yen Wu, Taipei (TW)

(73) Assignees: Lite-On Electronics (Guangzhou) Limited, Guangzhou (CN); Lite-On Technology Corp., Taipei (TW)

(*) Notice: Subject to any disclaimer, the term of this patent is extended or adjusted under 35 U.S.C. 154(b) by 203 days.

(21) Appl. No.: 13/963,379

(22) Filed: Aug. 9, 2013

(65) Prior Publication Data
US 2014/0064199 A1 Mar. 6, 2014

(30) Foreign Application Priority Data
Aug. 30, 2012 (CN) .......................... 2012 1 0314967

(51) Int. Cl.
| | |
|---|---|
| H04W 72/08 | (2009.01) |
| H04W 72/02 | (2009.01) |
| H04L 1/18 | (2006.01) |
| H04W 84/12 | (2009.01) |
| H04W 84/18 | (2009.01) |
| H04L 5/00 | (2006.01) |
| H04L 27/00 | (2006.01) |

(52) U.S. Cl.
CPC ........... *H04W 72/085* (2013.01); *H04L 1/1867* (2013.01); *H04W 72/02* (2013.01); *H04L 5/0062* (2013.01); *H04L 27/0006* (2013.01); *H04W 84/12* (2013.01); *H04W 84/18* (2013.01)

(58) Field of Classification Search
CPC . H04L 1/1867; H04L 27/0006; H04L 5/0062; H04W 72/02; H04W 72/085; H04W 84/12; H04W 84/18
USPC .......................................... 370/310, 328, 329
See application file for complete search history.

(56) References Cited

U.S. PATENT DOCUMENTS

| | | | |
|---|---|---|---|
| 8,331,289 B1* | 12/2012 | Lee et al. ....................... 370/328 |
| 2008/0045152 A1* | 2/2008 | Boes ............................. 455/63.1 |
| 2009/0258607 A1* | 10/2009 | Beninghaus et al. ........... 455/77 |
| 2010/0226348 A1* | 9/2010 | Thoukydides ................ 370/338 |
| 2011/0136433 A1* | 6/2011 | Tsai et al. ..................... 455/41.2 |
| 2011/0268051 A1* | 11/2011 | Tsao et al. ..................... 370/329 |
| 2011/0310741 A1* | 12/2011 | Ko et al. ....................... 370/235 |
| 2012/0058728 A1* | 3/2012 | Wang ................... H04W 72/085 455/62 |
| 2012/0302273 A1* | 11/2012 | Lin ....................... H04W 16/14 455/509 |
| 2013/0331137 A1* | 12/2013 | Burchill et al. ................ 455/501 |
| 2015/0030011 A1* | 1/2015 | Liu ....................... H04L 1/1893 370/336 |
| 2015/0163806 A1* | 6/2015 | Kobayashi ............ H04W 16/14 370/329 |

* cited by examiner

*Primary Examiner* — Chi H Pham
*Assistant Examiner* — Robert Lopata
(74) *Attorney, Agent, or Firm* — Rosenberg, Klein & Lee

(57) ABSTRACT

In a method for selecting an operation channel, a wireless network connecting apparatus is configured to: identify at least one preoccupied channel; determine a plurality of available channels; evaluate a channel quality of each of the available channels; select one of the available channels based on the channel quality thereof as the operation channel, and to switch to the operation channel; transmit an evaluation packet through the operation channel; determine whether the operation channel needs to be replaced, based on a number of data retransmissions; and exclude the operation channel from the available channels when the determination is affirmative.

13 Claims, 6 Drawing Sheets

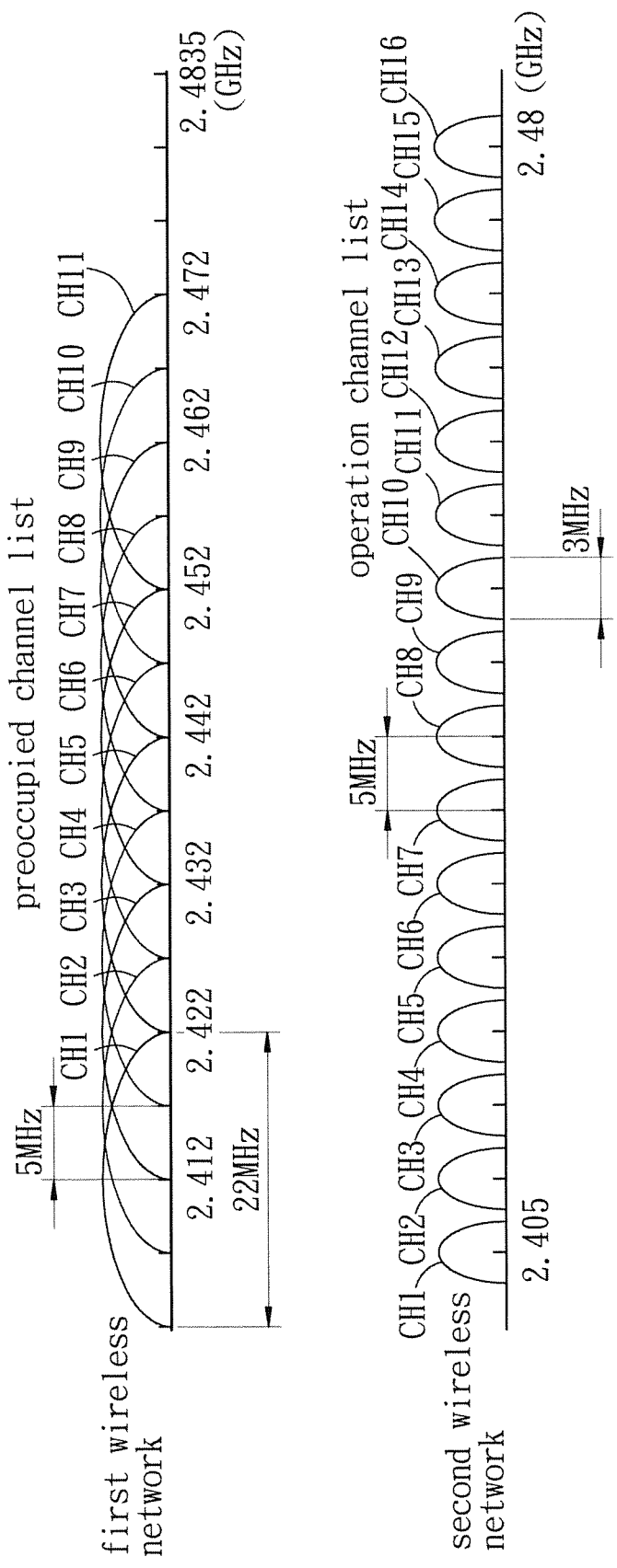
F I G. 2

METHOD AND CHANNEL SELECTOR FOR SELECTING AN OPERATION CHANNEL, AND WIRELESS NETWORK CONNECTING APPARATUS INCLUDING THE CHANNEL SELECTOR

CROSS-REFERENCE TO RELATED APPLICATION

This application claims priority of Chinese Application No. 201210314967.8, filed on Aug. 30, 2012.

BACKGROUND OF THE INVENTION

1. Field of the Invention

The invention relates to a method for selecting an operation channel, more particularly to a method and a channel selector that are configured to automatically select a channel with an optimal channel quality for operation, and to a wireless network connecting apparatus that includes the channel selector.

2. Description of the Related Art

Direct sequence spread spectrum (DSSS) is a modulation technique that is typically employed in wireless communications through an unlicensed 2.4 GHz industrial scientific medical (ISM) band. Examples of communications that use DSSS include a wireless universal serial bus (USE), IEEE 802.11b/g/a specification (commonly known as wireless fidelity, or Wi-Fi), and IEEE 802.15.4 specification (commonly known as ZigBee).

It is known that the Wi-Fi and ZigBee specifications have different yet complementary characteristics. Compared to the Wi-Fi specification, ZigBee specification offers short-range wireless transfer of data at relatively low transmission rate, but comes more preferable in terms of complexity and costs. Thus, there has been a growing need for allowing Wi-Fi and ZigBee co-existence. For example, a multi-interface wireless device, such as a Wi-Fi-ZigBee bridge, has been developed to enable communication using both specifications simultaneously.

However, since both communications operate on an identical band, it may be possible that communications using the two specifications may operate on overlapping channels. This may result in interference between the data transmissions and subsequent occurrence of data retransmissions. Subsequently, the overall transmission efficiency is reduced, and longer transmission time leads to power waste.

SUMMARY OF THE INVENTION

Therefore, one object of the present invention is to provide a method that is capable of dynamically monitoring data transmission efficiency of a channel, through which a multi-interface wireless device communicates with a wireless network, and to switch to another channel when the data transmission efficiency drops below an acceptable threshold.

Accordingly, a method of this invention method is for selecting an operation channel, and is to be implemented by a wireless network connecting apparatus. The method comprises the following steps of:

(a) obtaining, by the wireless network connecting apparatus, information about at least one preoccupied channel for a first wireless network over which the wireless network connecting apparatus is able to communicate with a first wireless device through the preoccupied channel, and determining by the wireless network connecting apparatus, from a plurality of candidate channels of a second wireless network, a plurality of available channels by excluding the candidate channels that overlap with the preoccupied channel through which the wireless network connecting apparatus is able to communicate with a second wireless device, the first wireless network having a maximum data transmission rate larger than that of the second wireless network;

(b) evaluating, by the wireless network connecting apparatus, a channel quality of each of the available channels over the second wireless network;

(c) selecting, by the wireless network connecting apparatus, one of the available channels based on the best channel quality thereof as the operation channel, and switching by the wireless network connecting apparatus to the operation channel for the second wireless network, over which the wireless network connecting apparatus is able to communicate with the second wireless device through the operation channel;

(d) transmitting, by the wireless network connecting apparatus, an evaluation packet through the operation channel to the second wireless device;

(e) determining, by the wireless network connecting apparatus, whether the operation channel needs to be replaced, based on a retransmission threshold of data retransmissions by the wireless network connecting apparatus and associated with the evaluation packet; and (f) when the determination made in step (e) is affirmative, excluding, by the wireless network connecting apparatus, the operation channel from the available channels, and repeating steps (b) to (e).

Another object of the present invention is to provide a channel selector that is configured to execute the aforementioned method.

Accordingly, a channel selector of the present invention is for selecting an operation channel. The channel selector may be used in a wireless network connecting apparatus that is able to connect to a first wireless network and a second wireless network. The wireless network connecting apparatus is configured to communicate with a first wireless device over the first wireless network through at least one preoccupied channel, and to communicate with the second wireless network through the operation channel. The first wireless network has a maximum data transmission rate larger than that of the second wireless network. The channel selector comprises a channel management unit, a selecting unit, and a monitoring unit.

The channel management unit is configured to obtain information about the preoccupied channel, and to determine a plurality of available channels from the candidate channels by excluding the candidate channels that overlap with the preoccupied channel.

The selecting unit is coupled to the channel management unit, is configured to evaluate a channel quality of each of the available channels, and to select one of the available channels based on the channel quality thereof as the operation channel through which the wireless network connecting apparatus transmits an evaluation packet to the second wireless device.

The monitoring unit is coupled to the channel management unit and the selecting unit, and is configured to monitor data retransmissions by the wireless network connecting apparatus and associated with the evaluation packet, determine whether the operation channel needs to be replaced based on a number of the data retransmissions monitored thereby, and cause the channel management unit to exclude the operation channel from the available channels when it is determined that the operation channel needs to be replaced, and cause the selecting unit to reevaluate the channel quality of each of remaining ones of the available channels for selecting a new operation channel.

Yet another object of the present invention is to provide a computer program product comprising a non-transitory machine-readable storage medium having machine-executable program code instructions which are stored therein. When executed by a machine coupled to the non-transitory machine-readable storage medium, the machine-executable program code instructions configure the machine to execute consecutive steps of the aforementioned method.

Still another object of the present invention is to provide a wireless network connecting apparatus that is capable of connecting to a first wireless network and a second wireless network. The first wireless network has a maximum data transmission rate larger than that of the second wireless network. The wireless network connecting apparatus comprises a first transceiving unit, a second transceiving unit, and a processor.

The first transceiving unit is configured to communicate with a first wireless device over the first wireless network through a preoccupied channel.

The second transceiving unit is configured to communicate with a second wireless device over the second wireless network through one of a plurality of candidate channels.

The processor is coupled to the first and second transceiving units and includes a channel selector. The channel selector includes a channel management unit, a selecting unit and a monitoring unit.

The channel management unit is configured to determine a plurality of available channels from the candidate channels by excluding the candidate channels that overlap with the preoccupied channel.

The selecting unit is coupled to the channel management unit, is configured to evaluate a channel quality of each of the available channels, and is configured to select one of the available channels based on the channel quality as an operation channel through which an evaluation packet is transmitted to the second wireless device via the second transceiving unit.

The monitoring unit is coupled to the channel management unit and the selecting unit, and is configured to monitor data retransmissions by the second transceiving unit and associated with the evaluation packet, determine whether the operation channel needs to be replaced based on a number of the data retransmissions monitored thereby, and cause the channel management unit to exclude the operation channel from the available channels when it is determined that the operation channel needs to be replaced, and cause the selecting unit to reevaluate the channel quality of each of remaining ones of the available channels for selecting a new operation channel.

BRIEF DESCRIPTION OF THE DRAWINGS

Other features and advantages of the present invention will become apparent in the following detailed description of the preferred embodiments with reference to the accompanying drawings, of which:

FIG. 2 illustrates communication channel designations of first and second wireless networks that operate on a 2.4 GHz industrial scientific medical (ISM) band;

DETAILED DESCRIPTION OF THE PREFERRED EMBODIMENTS

Figure 1:
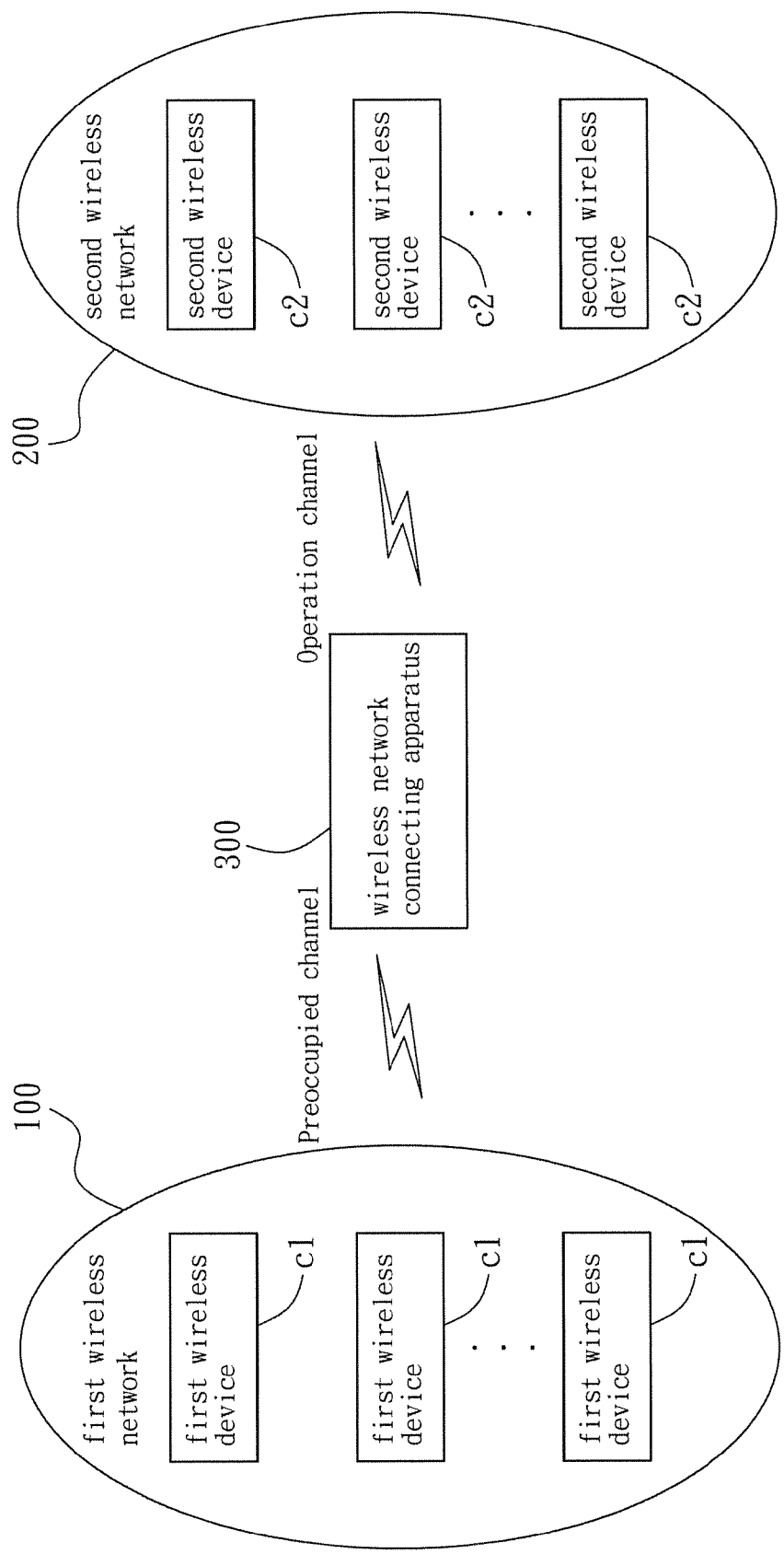
FIG. 1 is a schematic block diagram of a wireless network connecting apparatus that is capable of connecting to a first wireless network and a second wireless network, according to a first preferred embodiment of the present invention.

Before the present invention is described in greater detail, it should be noted that like elements are denoted by the same reference numerals throughout the disclosure.

As shown in FIG. 1, a wireless network connecting apparatus 300 according to the first preferred embodiment of the present invention is capable of connecting to a first wireless network 100 and a second wireless network 200. The first wireless network 100 has a plurality of first wireless devices (c1) that are able to communicate with the wireless network connecting apparatus 300 through at least one preoccupied channel that is selected from a plurality of usable channels that are associated with the first wireless network 100.

The second wireless network 200 has a plurality of second wireless devices (c2) that are able to communicate with the wireless network connecting apparatus 300 through an operation channel that is selected from a plurality of usable channels that are associated with the second wireless network 200. Thus, the first and second wireless devices (c1) and (c2) are able to communicate with each other through the wireless network connecting apparatus 300.

In this embodiment, the first wireless network 100 conforms with wireless fidelity (Wi-Fi) specification, and the second wireless network 200 conforms with ZigBee specification. The wireless network connecting apparatus 300 is a multi-interface wireless device, such as a Wi-Fi-ZigBee bridge. Each of the first wireless devices (c1) may be a device that supports Wi-Fi communication, such as a wireless access point (WAP), a cellphone, a computer or other similar electronic devices. Each of the second wireless devices (c2) may be a device that supports ZigBee communication, such as a wireless speaker, lighting switch, air conditioning control or other similar electronic devices.

Each of the first and second wireless networks 100 and 200 operates in a 2.4 GHz industrial scientific medical (ISM) band. The first wireless network 100 is designated with 11 preoccupied channels, and the second wireless network 200 is designated with 16 candidate channels.

An exemplary communication channel designation associated with the first and second wireless networks 100 and 200 in the 2.4 GHz ISM band is shown in FIG. 2. The wireless network connecting apparatus 300 is operable to communicate with the first wireless network 100 using one of the preoccupied channels, and with the second wireless network 200 using an operation channel selected from the candidate channels. In a practical example, a cellphone serving as a first wireless device (c1) is able to remotely control a lighting switch serving as a second wireless device (c2) by transmitting data and/or commands to the second wireless device (c2) via one of the preoccupied channels, the wireless network connecting apparatus 300 and one of the candidate channels.

The preoccupied channels (i.e., WiFi communication channels) take up a frequency band ranging from 2.412 to 2.462 GHz. This frequency band is divided into 11 channels each having a 22 MHz bandwidth, and spaced 5 MHz apart with adjacent channels, thus creating WiFi channel overlaps. As shown in FIG. 2, a first channel (channel 1) is centered on 2.412 GHz and an eleventh channel (channel 11) is centered on 2.462 GHz. Similarly, the Zigbee specification has a transmission frequency range between 2.405 GHz and 2.48 GHz, and is divided into 16 non-overlapping channels, each of which has a 3 MHz bandwidth and is 5 MHz apart from an adjacent channel. It can be seen that, for each of the preoccupied channels that is working, certain candidate channels are overlapped due to the wide bandwidth taken up by the working preoccupied channel.

In this embodiment, to avoid the potential interference attributed to overlapping communication channels, the wireless network connecting apparatus 300 is configured to switch the operation channel for communication with the second wireless network 200. This is because the Wi-Fi communication has a larger maximum data transmission rate and range, and is more power consuming. As a result, potential costs associated with switching the operation channel for the second wireless network 200 is more cost-effective than switching the preoccupied channel for the first wireless network 100 (hence, the communication channels used by the Wi-Fi communication are considered "preoccupied").

Figure 3:
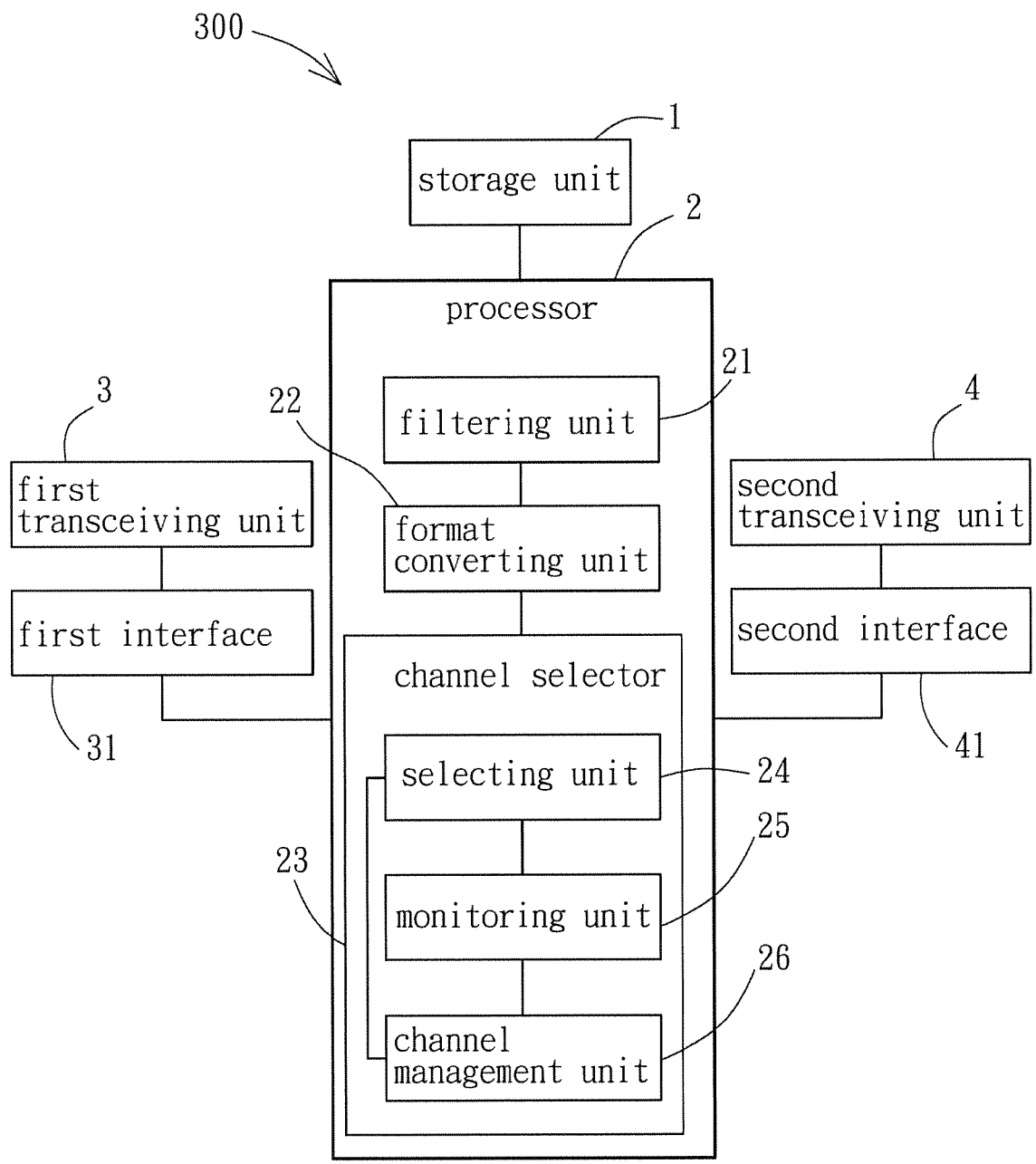
FIG. 3 is a schematic block diagram of the wireless network connecting apparatus according to an aspect of the first preferred embodiment.

As shown in FIG. 3, the wireless network connecting apparatus 300 comprises a storage unit 1, a processor 2 coupled to the storage unit 1, and first and second transceiving units 3 and 4 that are coupled to the processor 2 via first and second interfaces 31 and 41, respectively.

The first transceiving unit 3 is configured to communicate with the first wireless devices (c1) over the first wireless network 100 through one of the preoccupied channels, and the second transceiving unit 4 is configured to communicate with the second wireless devices (c2) over the second wireless network 200 through one of the candidate channels. The storage unit 1 is stored with an address list and a channel list. The address list includes addresses of the first wireless devices (c1) associated with the first wireless network 100, and addresses of the second wireless devices (c2) associated with the second wireless network 200. The channel list includes the candidate channels, and is marked with unavailable ones of the candidate channels.

The processor 2 includes a filtering unit 21, a format converting unit 22 and a channel selector 23.

In this embodiment, the processor 2 is a micro control unit (MCU) of the Wi-Fi-ZigBee bridge, the first transceiving unit 3 is a Wi-Fi transceiving device, the first interface 31 is a secure digital input output (SDIO) interface that supports Wi-Fi communication, the second transceiving unit 4 is a ZigBee transceiving device, and the second interface 41 is an universal asynchronous receiver/transmitter (UART) hardware interface that supports ZigBee communication.

In operation, the wireless network connecting apparatus 300 is configured to receive data and commands from each of the first and second wireless devices (c1) and (c2). Data transmitted by the first wireless devices (c1) conform with Wi-Fi format, while data transmitted by the second wireless devices (c2) conform with ZigBee cluster library (ZCL) format. When the first and second wireless devices (c1) and (c2) need to communicate with each other via the wireless network connecting apparatus 300, the format converting unit 22 of the processor 2 is configured to translate the data received from one of the first and second wireless devices (c1) and (c2) into a format supported by the other one of the first and second wireless devices (c1) and (c2).

Specifically, in an example, when a packet sent from the first wireless network 100 is received by the first transceiving unit 3 and transmitted to the processor 2, the filtering unit 21 of the processor 2 extracts a source address and a destination address from the received packet. The filtering unit 21 then compares the source address with the addresses of the first wireless devices (c1) and the destination address with the addresses of the second wireless devices (c2) in the address list. As such, the exact source address (of one of the first wireless devices (c1)) and the intended destination address (of one of the second wireless devices (c2)) of the received packet can be determined. The format converting unit 22 then converts the format of the received packet from the Wi-Fi format into the ZCL format, and the second transceiving unit 4 transmits the converted packet to a destination one of the second wireless devices (c2). In other examples, the packet can be sent from one of the second wireless devices (c2) (serving as the source), and intended for one of the first wireless devices (c1) (serving as the destination). In these examples, the format converting unit 22 is configured to convert the format of the received packet from the ZCL format into the Wi-Fi format.

When the first wireless device (c1) is connected to the first wireless network 100 and starts data transmission through one of the preoccupied channels (the specific preoccupied channel can be chosen by the first wireless devices (c1), or determined by a user), the channel selector 23 is operable to mark the candidate channels that overlap with the one of the preoccupied channels in the channel list as unavailable for the second wireless network 200. Subsequently, the channel selector 23 is limited to select the operation channel from the remaining unmarked (i.e., "available") candidate channels for data transmission between the second wireless devices (c2) and the second transceiving unit 4.

Figure 4:
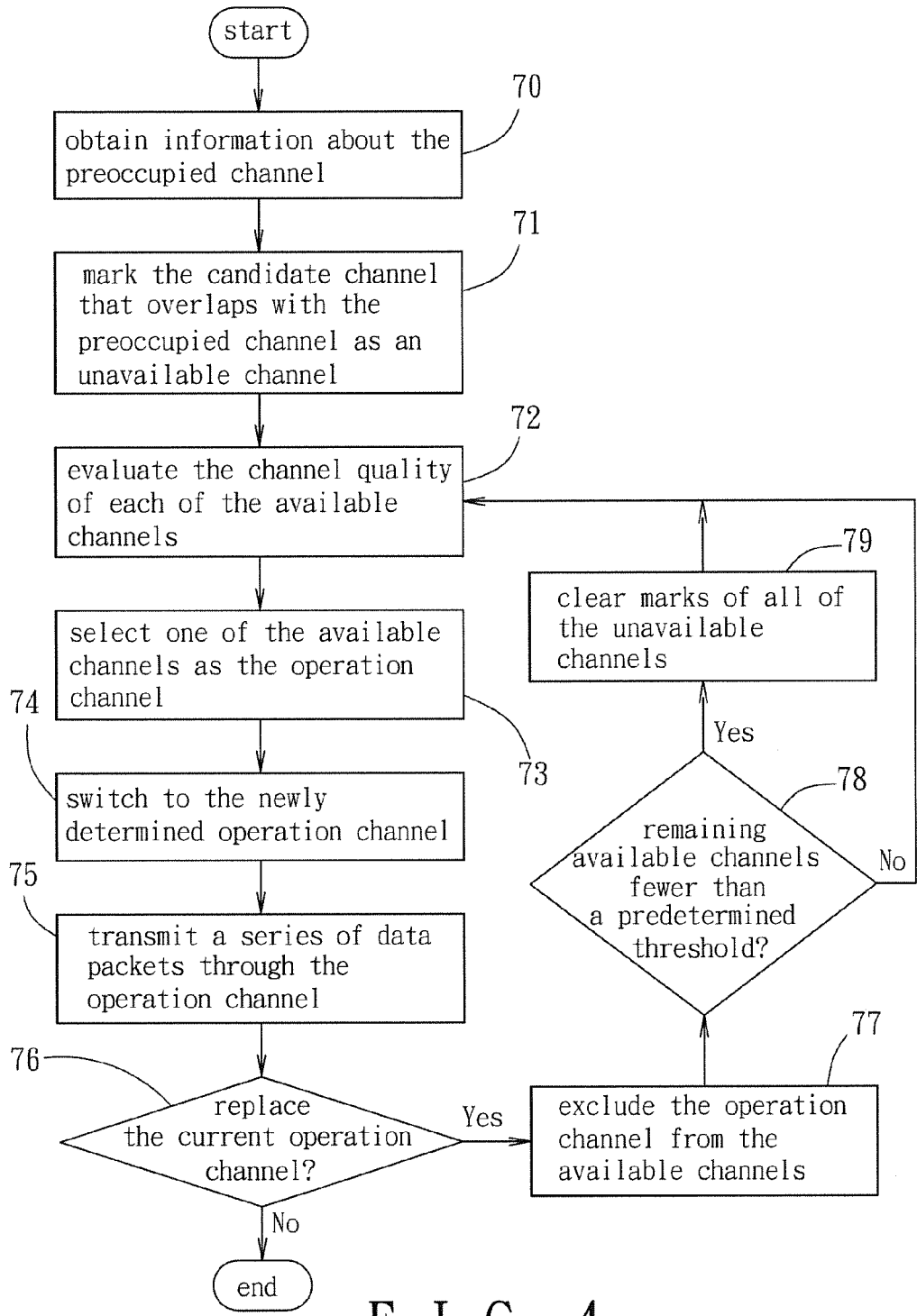
FIG. 4 is a flow chart of a method for selecting an operation channel, according to the first preferred embodiment of the present invention.

Specifically, the channel selector 23 is configured to perform a method for selecting the operation channel for the second transceiving unit 4 of the wireless network connecting apparatus 300 to communicate with the second wireless devices (c2) using the second wireless network 200, according to this embodiment. The channel selector 23 includes a selecting unit 24, a monitoring unit 25, and a channel management unit 26 that are coupled with one another. The steps of the method for selecting the operation channel will now be described with reference to FIG. 4.

In step 70, the channel management unit 26 is operable to obtain the channel list that includes the candidate channels, and information about the preoccupied channel. The information about the preoccupied channel may include the communication channels the first wireless network 100 intends to use and/or the currently used preoccupied channel, and may be updated whenever the preoccupied channel changes.

In step 71, the channel management unit 26 is operable to determine whether any of the candidate channels overlaps with the preoccupied channel based on the information about the preoccupied channel obtained in step 70. For each candidate channel that overlaps with the preoccupied channel, the channel management unit 26 marks the candidate channel as an unavailable channel. In the cases where no information about the preoccupied channel is available (e.g., the channel list is not yet updated), step 71 may be omitted, thus leaving all candidate channels in the channel list available.

Then, in step 72, the selecting unit 24 is configured to evaluate the channel quality of each of the available channels. In this embodiment, evaluation of the channel quality can be done by causing the second transceiving unit 4 to transmit an evaluation packet to the second wireless device (c2) through each of the available channels and to receive a response packet sent by the second wireless device (c2) through each of the available channels. A link quality indicator (LQI) and/or a received signal strength indicator (RSSI) can be calculated according to each of the response packets for determining the respective channel qualities. Various similar indices can be employed in other embodiments.

In step 73, the selecting unit 24 is operable to select one of the available channels, based on the channel quality, as the operation channel. In this embodiment, the selecting unit 24 selects one of the available channels having a best channel quality (e.g., experiencing a small interference) as the operation channel, and causes the second transceiving unit 4 to transmit a switching instruction packet to the second wireless devices (c2) for instructing the same to switch to the newly determined operation channel.

In step 74, the selecting unit 24 causes the second transceiving unit 4 to switch to the newly determined operation channel, in order for the wireless network connecting apparatus 300 to communicate with the second wireless devices (c2) therethrough.

In step 75, the second transceiving unit 4 is configured to sequentially transmit a series of data packets, which serve as a series of evaluation packets, to the second wireless devices (c2) through the newly determined operation channel. In this embodiment, the second transceiving unit 4 transmits one evaluation packet every 1 second. The monitoring unit 25 is configured to update a data retransmissions entry that records the largest number of data retransmissions by the second transceiving unit 4 associated with a single evaluation packet. The data retransmission may be requested by the second wireless devices (c2) due to low communication quality. That is, the more frequently an evaluation packet is requested for retransmission, the worse the channel quality of the operation channel probably is.

The monitoring unit 25 determines whether to replace the current operation channel in step 76. For example, when the channel quality of the operation channel is deemed unacceptable, the monitoring unit 25 attempts to replace the current operation channel. This determination may be based on the data retransmission entry and a predetermined retransmission threshold. In this embodiment, the retransmission threshold value is set as 10, meaning that when the monitoring unit 25 detects more than 10 requests for retransmission associated with one particular evaluation packet, the operation channel then needs to be replaced. Various threshold values and evaluation packet transmission frequencies may be adopted in other embodiments. When the monitoring unit 25 determines not to replace the operation channel, the method may be terminated. In other embodiments, the flow may go back to step 75 to continue monitoring. In some embodiments, when a predetermined time has elapsed after the operation channel has been determined, the flow starts over again to evaluate each of the candidate channels to decide whether the determined operation channel needs to be replaced.

In step 77, when the operation channel needs to be replaced, the channel management unit 26 excludes the operation channel from the available channels, by marking the operation channel in the channel list as unavailable.

Before a new operation channel is selected, in step 78, the monitoring unit 25 is configured to determine whether a number of the remaining available channels is lower than a predetermined threshold. Preferably, the threshold is set at a number larger than one fourth of the number of the candidate channels (i.e., 16), such as 5. The reason for such setting is as follows. Firstly, when the selectable candidate channels are insufficient, the lack of possible choices may decrease the potential data transmission efficiency. Secondly, the channel quality of each of the candidate channels is constantly changing, and by the time a majority of the candidate channels are marked as unavailable (thus leaving less than a quarter of the candidate channels available), channel qualities of many of the previously marked channels may have improved enough for communication.

When the determination made in step 78 is affirmative, the monitoring unit 25 causes the channel management unit 26 to clear marks of all of the unavailable channels in step 79, and the flow goes back to step 72 such that selecting unit 24 is configured to reevaluate the channel quality of each of the available channels for selecting a new operation channel. Otherwise, the flow goes directly back to step 72.

It is noted that, whenever during the method, in response to change of the preoccupied channel (reflected on the channel list), the flow goes to step 71 and the operation channel is selected accordingly. Such is done because the first wireless network 100 (Wi-Fi) has a larger maximum data transmission rate. Therefore, it is preferable that the communication channel with the best quality be reserved for the first wireless network 100. When the current operation channel overlaps with the changed preoccupied channel, the second wireless network 200 yields the operation channel.

In brief, the method for selecting the operation channel is capable of dynamically monitoring the current operation channel, and to switch to another operation channel when the current operation channel is considered not suitable for communication. Meanwhile, the data transmission over the first wireless network 100 is unaffected during the entire operation.

The method for selecting the operation channel can be implemented by either hardware or software. In this embodiment, the channel selector 23 includes a computer program having machine-executable program code instructions which are stored in the storage unit 1. When the program code instructions are executed, the processor 2 is configured to execute consecutive steps of the method.

Specifically, the MCU of the wireless network connecting apparatus 300 is configured to obtain information about the preoccupied channel, such that the channel selector 23 is aware of which of the candidate channels are available for the second wireless network 200. The second transceiving device 4 then transmits the evaluation packets to the second wireless devices (c2) using each of the available channels to evaluate a channel quality thereof. The channel selector 23 subsequently selects one of the available channels based on the channel quality thereof as the operation channel, and to switch to the operation channel. Before switching, the switching instruction packet is sent to the second wireless devices (c2) for instructing the same to switch to the newly determined operation channel.

The operation channel for the second wireless network 200 can be replaced whenever the monitoring unit 25 determines that the channel quality of the operation channel is unacceptable. When the data retransmissions associated with a single evaluation packet occur more times than the predetermined retransmission threshold, the channel selector 23 marks the current operation channel as unavailable, and reevaluates the channel quality of each of remaining ones of the available channels for selecting a new operation channel. When number of the remaining available channels is below a predetermined threshold, all the unavailable marks, except those deemed to be overlapped with the preoccupied channels, are cleared.

In some embodiments, various types of networks may serve as the first and second wireless networks 100 and 200, as long as the first wireless network 100 has a larger maximum data transmission rate. Accordingly, the first and second interfaces 31 and 41 are changed to support the formats of the first and second wireless networks 100 and 200. For example, other wireless communication techniques that operate on the 2.4 GHz ISM band and that use direct sequence spread spectrum (DSSS), such as wireless universal serial bus (USB), 2.4 GHZ wireless telephone, and code division multiple access (CDMA) system, can be employed as one of the first and second wireless networks 100 and 200.

Figure 5:
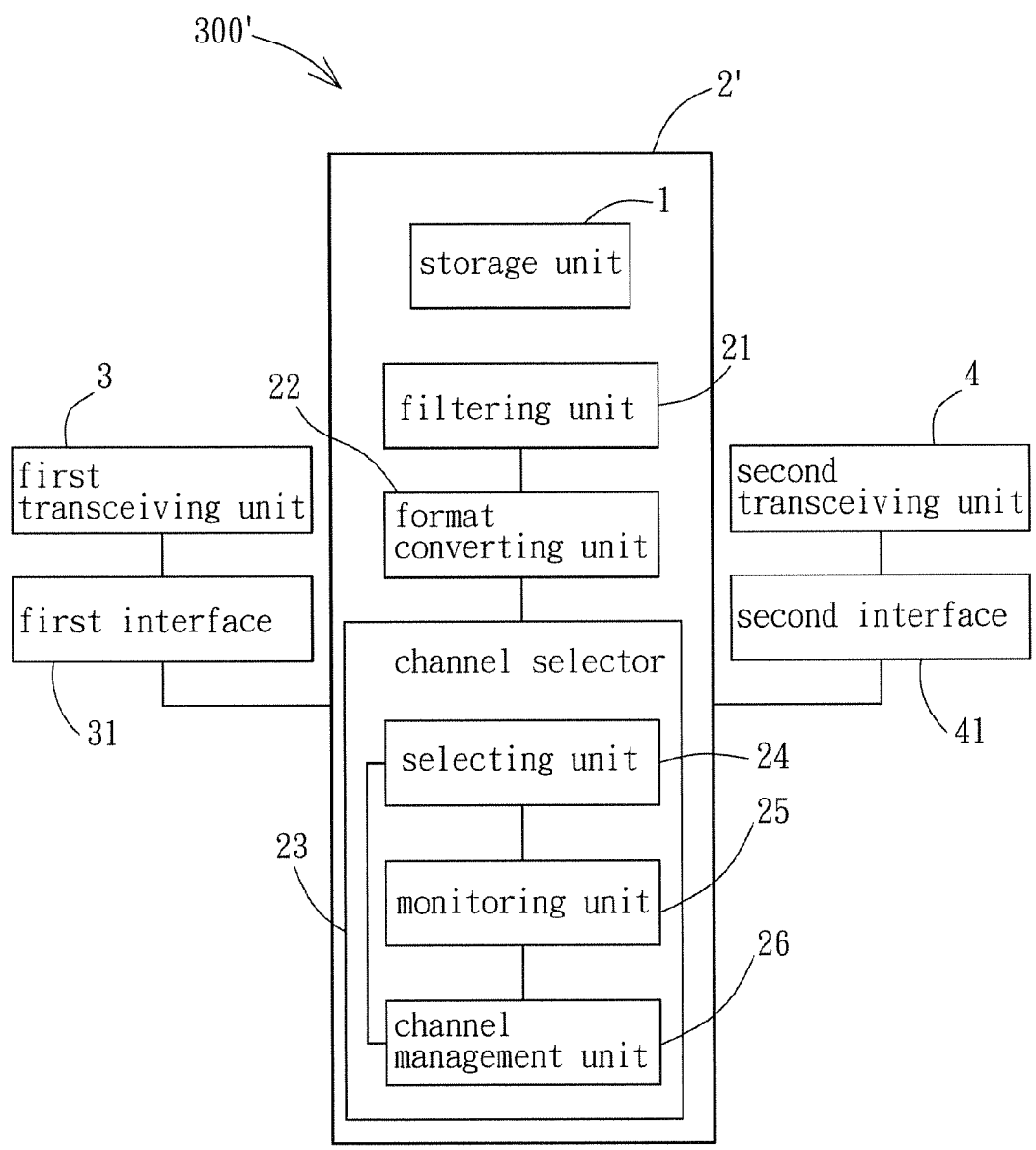
FIG. 5 is a schematic block diagram of the wireless network connecting apparatus according to another aspect of the first preferred embodiment.

It should be noted that, in some embodiments, the channel selector 23 may be a component separate from the wireless network connecting apparatus 300. In some embodiments, the wireless network connecting apparatus 300 may be various devices that have multiple network interfaces, such as a gateway, a router, etc. In some embodiments as illustrated in FIG. 5, the storage unit 1 is built into the processor 2'. In other embodiments the storage unit 1 may be as a device separated from the processor 2'.

Figure 6:
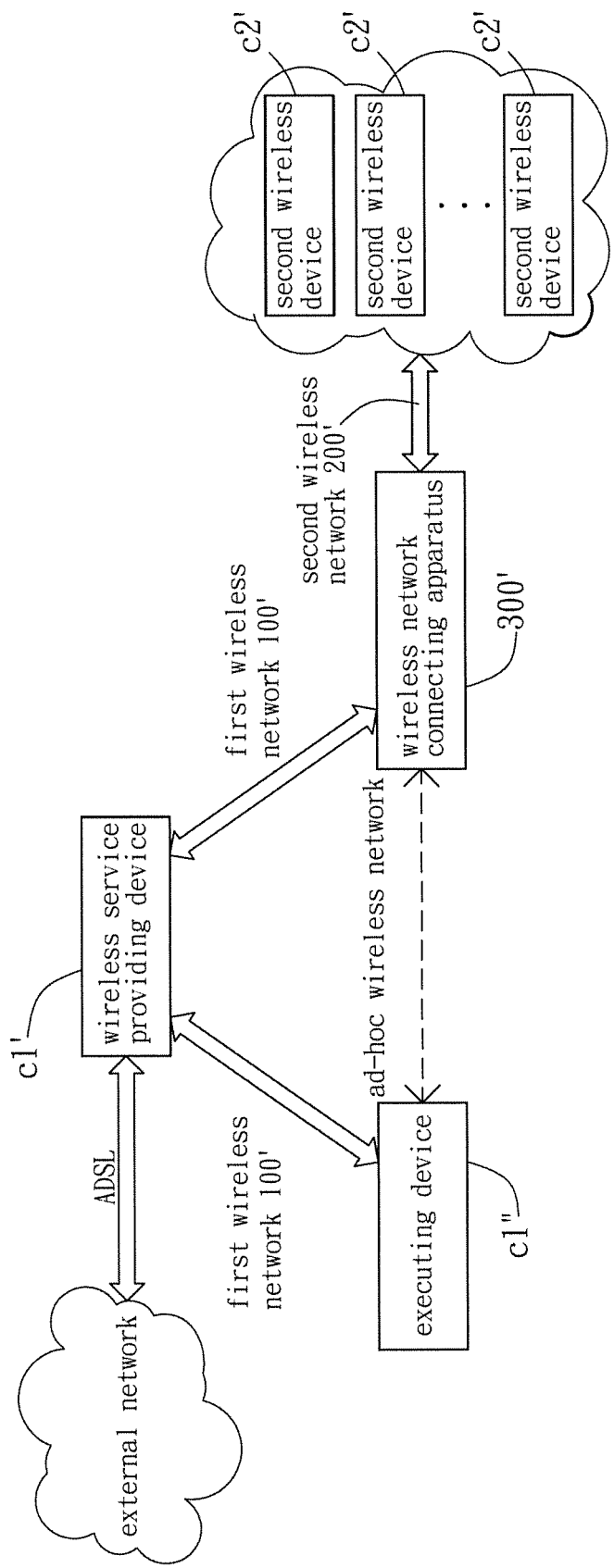
FIG. 6 is a schematic block diagram of the wireless network connecting apparatus, according to a second preferred embodiment of the present invention.

As shown in FIG. 6, the second preferred embodiment of a wireless network connecting apparatus 300' according to the present invention has a structure similar to that of the first embodiment. The main difference between this embodiment and the previous embodiment resides in the following.

The wireless network connecting apparatus 300' is provided with transceiving devices and interfaces for communication with the first and second wireless networks 100' and 200'. The second wireless network 200' in this embodiment includes a plurality of second wireless devices (c2') that are able to communicate with the wireless network connecting apparatus 300'. The second wireless devices (c2') and the wireless network connecting apparatus 300' do not include a display and/or an input interface for receiving user-input data, and therefore cannot be manually connected to an external network.

The first wireless network 100' in this embodiment is provided with a wireless service providing device (c1') and an executing device (c1"). To communicate with the first wireless network 100', the wireless network connecting apparatus 300' is operable to establish an ad-hoc wireless network with the executing device (c1"), and to receive an access setting from the executing device (c1") over the ad-hoc wireless network, the access setting enabling the wireless network connecting apparatus 300' to connect to the wireless service providing device (c1') through the first wireless network 100'. After the wireless network connecting apparatus 300' is connected to the first wireless network 100', the executing device (c1"), which is operated by a user, is operable to remotely control the wireless network connecting apparatus 300' through the first wireless network 100'. However, the instant disclosure is not limited thereto. For example, the wireless network connecting apparatus 300' may be provided with display and/or input interfaces. Moreover, the communication between the wireless network connecting apparatus 300' and the executing device (c1") may be other than the ad-hoc wireless network, such as Ethernet.

In this embodiment, the wireless service providing device (c1') may be, for example, a wireless access point (WAP). The executing device (c1") may be a device that supports Wi-Fi communication, such as a cellphone, a computer or other similar electronic devices. The first wireless network 100' conforms with wireless fidelity (Wi-Fi) specification, and the second wireless network 200' conforms with ZigBee specification. The second wireless devices (c2') may be a wireless lighting switch, air conditioner, wireless speaker or the like, and are configured to have ZigBee transceiving functionality. The wireless network connecting apparatus 300' is a network connector configured to have both Wi-Fi and ZigBee transceiving functionalities, such as a Wi-Fi-ZigBee bridge. In some embodiments, various types of networks may serve as the first and second wireless networks 100' and 200', as long as the first wireless network 100' has a larger maximum data transmission rate.

In operation, the wireless network connecting apparatus 300' and the wireless service providing device (c1') are able to communicate with each other through a preoccupied channel selected from the communication channels. For communication with the second wireless devices (c2') over the second wireless network 200', the wireless network connecting apparatus 300' is configured to execute consecutive steps of the method as described above, and select an operation channel that not only does not overlap with the preoccupied channel, but also has the best channel quality. The executing device (c1') can remotely control operation of the second wireless devices (c2') via the wireless network connecting apparatus 300', when the network connections of the wireless network connecting apparatus 300' and the second wireless devices (c2') are successfully established.

The second preferred embodiment has the same advantages as those of the first preferred embodiment.

To sum up, the method and channel selector 23 for selecting an operation channel, and the wireless network connecting apparatus 300, 300' including the channel selector 23 according to embodiments of the present invention have a number of advantages, listed as follows.

(1) For selecting the operation channel, the channel list allows the channel selector 23 to keep track of the candidate channels that do not overlap with the preoccupied channel, such that the communications through the first and second wireless networks 100, 200 always have a minimum interference therebetween.

(2) During operation, the selecting unit 24 of the channel selector 23 is operable to select one of the available channels, based on the channel quality, as the operation channel that not only does not overlap with the preoccupied channel, but also has the best channel quality. The monitoring unit 25 of the channel selector 23 sequentially transmits the series of evaluation packets to determine whether channel quality of the current operation channel is acceptable, and when it is not the case, the current operation channel is promptly replaced by one having a better channel quality. As a result, the communications efficiency through the second wireless network 200, 200' is increased due to the reduction of data retransmissions. Subsequently, the data transmission using embodiments of the present invention is less time-consuming and therefore more energy efficient.

(3) When employing the present invention, the first wireless device (c1, c1") is enabled to control operation of the second wireless devices (c2, c2') via the wireless network connecting apparatus 300, 300' over the first wireless network 100, 100'.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for selecting an operation channel to be implemented by a wireless network connecting apparatus, the method comprising the following steps of:
   (a) obtaining, by the wireless network connecting apparatus, information about at least one preoccupied channel for a first wireless network over which the wireless network connecting apparatus is able to communicate with a first wireless device through the preoccupied channel, and determining by the wireless network connecting apparatus, from a plurality of candidate channels of a second wireless network, a plurality of available channels by excluding the candidate channels that overlap with the preoccupied channel through which the wireless network connecting apparatus is able to communicate with a second wireless device, the first wireless network having a maximum data transmission rate larger than that of the second wireless network;

(b) evaluating, by the wireless network connecting apparatus, a channel quality of each of the available channels over the second wireless network;

(c) selecting, by the wireless network connecting apparatus, one of the available channels based on the best channel quality thereof as the operation channel, and switching by the wireless network connecting apparatus to the operation channel for the second wireless network, over which the wireless network connecting apparatus is able to communicate with the second wireless device through the operation channel;

(d) transmitting, by the wireless network connecting apparatus, an evaluation packet through the operation channel to the second wireless device;

(e) determining, by the wireless network connecting apparatus, whether the operation channel needs to be replaced, based on a retransmission threshold of data retransmissions by the wireless network connecting apparatus associated with the evaluation packet; and (f) when the determination made in step (e) is affirmative, excluding, by the wireless network connecting apparatus, the operation channel from the available channels, and repeating steps (b) to (e).

2. The method of claim 1, wherein, in step (a), the wireless network connecting apparatus obtains a channel list that includes the candidate channels, and to mark the candidate channels that overlap with the preoccupied channel in the channel list as unavailable channels.

3. The method of claim 2, wherein, in step (f) and prior to repeating step (b), the wireless network connecting apparatus marks the operation channel as an unavailable channel, and clears marks of all of the unavailable channels in the channel list when a number of the available channels is lower than a predetermined threshold.

4. The method of claim 1, wherein the first wireless network conforms with wireless fidelity (Wi-Fi) specification, and the second wireless network conforms with ZigBee specification.

5. A computer program product comprising a non-transitory machine-readable storage medium having machine-executable program code instructions which are stored therein and which, when executed by a machine coupled to the non-transitory machine-readable storage medium, configure the machine to execute consecutive steps of the method of claim 1.

6. A wireless network connecting apparatus capable of connecting to a first wireless network and a second wireless network, the first wireless network having a maximum data transmission rate larger than that of the second wireless network, said wireless network connecting apparatus comprising:

a first transceiving unit configured to communicate with a first wireless device over the first wireless network through a preoccupied channel;

a second transceiving unit configured to communicate with a second wireless device over the second wireless network through one of a plurality of candidate channels; and a processor coupled to said first and second transceiving units and including a channel selector, said channel selector including:

a channel management unit configured to determine a plurality of available channels from the candidate channels by excluding the candidate channels that overlap with the preoccupied channel; and a selecting unit coupled to said channel management unit, and configured to evaluate a channel quality of each of the available channels, and to select one of the available channels based on the channel quality as an operation channel through which an evaluation packet is transmitted to the second wireless device via said second transceiving unit.

7. The wireless network connecting apparatus of claim 6, wherein said channel selector further includes a monitoring unit coupled to said channel management unit and said selecting unit, and configured to:

monitor data retransmissions by said second transceiving unit associated with the evaluation packet;

determine whether the operation channel needs to be replaced based on a number of the data retransmissions monitored thereby; and cause said channel management unit to exclude the operation channel from the available channels when it is determined that the operation channel needs to be replaced, and cause said selecting unit to reevaluate the channel quality of each of remaining ones of the available channels for selecting a new operation channel.

8. The wireless network connecting apparatus of claim 7, wherein, when it is determined by said monitoring unit that the operation channel needs to be replaced, said monitoring unit causes said channel management unit to mark the operation channel as an unavailable channel in a channel list that includes the candidate channels, said monitoring unit further causes said channel management unit to clear marks of all of the unavailable channels when a number of the available channels is lower than a predetermined threshold, and said monitoring unit causes said selecting unit to reevaluate the channel quality of each of the available channels, and to select one of the available channels as the new operation channel based on the channel quality thereof.

9. The wireless network connecting apparatus of claim 6, wherein said selecting unit is configured to evaluate the channel quality of each of the available channels using one of a link quality indicator (LQI) and a received signal strength indicator (RSSI).

10. The wireless network connecting apparatus of claim 6, further comprising a storage unit that is coupled to said processor and that is stored with at least one of:

the number of data retransmissions associated with the evaluation packet and monitored by said monitoring unit;

an address list including an address of the second wireless device associated with the second wireless network, and an address of the first wireless device associated with the first wireless network; and a channel list that includes the candidate channels and that is marked with the unavailable ones of the candidate channels.

11. The wireless network connecting apparatus of claim 10, wherein said processor further includes:

a filtering unit configured to compare a source address and a destination address contained in a received packet received from one of the first and second wireless devices, and the addresses of the first and second wireless devices included in the address list; and a format converting unit coupled to said filtering unit and configured to convert a format of the received packet when it is determined by said filtering unit that the source address conforms with the address of one of the first and second wireless devices, and that the destination address conforms with the address of the other one of the first and second wireless devices, wherein a converted format of the received packet enables transmission of the received packet received from said one of the first and second wireless devices to the other one of the first and second wireless devices through a corresponding one of the first and second wireless networks.

12. The wireless network connecting apparatus of claim 6, wherein said processor further includes:

a storage unit that is stored with at least one of: the number of data retransmissions associated with the evaluation packet and monitored by said monitoring unit; an address list including an address of the second wireless device associated with the second wireless network, and an address of the first wireless device associated with the first wireless network; and a channel list that includes the candidate channels and that is marked with the unavailable ones of the candidate channels;

a filtering unit configured to compare a source address and a destination address contained in a received packet received from one of the first and second wireless devices, and the addresses of the first and second wireless devices included in the address list; and a format converting unit coupled to said filtering unit and configured to convert a format of the received packet when it is determined by said filtering unit that the source address conforms with the address of one of the first and second wireless devices, and that the destination address conforms with the address of the other one of the first and second wireless devices, wherein a converted format of the received packet enables transmission of the received packet received from said one of the first and second wireless devices to the other one of the first and second wireless devices through a corresponding one of the first and second wireless networks.

13. The wireless network connecting apparatus of claim 6, wherein the first wireless network conforms with wireless fidelity (Wi-Fi) specification, and the second wireless network conforms with ZigBee specification.

* * * * *